US012803900B2

(12) United States Patent
Krishnaswamy et al.

(10) Patent No.: US 12,803,900 B2
(45) Date of Patent: Nov. 17, 2026

(54) REDUCING CONTRACTION LOSS IN A NETWORK USING DYNAMICALLY GENERATED RULES

(71) Applicant: Microsoft Technology Licensing, LLC, Redmond, WA (US)

(72) Inventors: Umesh Krishnaswamy, San Jose, CA (US); Yi Li, Redmond, WA (US); Paul David Mattes, Saint Paul, MN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 18/961,431

(22) Filed: Nov. 26, 2024

(65) Prior Publication Data

US 2026/0067204 A1 Mar. 5, 2026

Related U.S. Application Data

(60) Provisional application No. 63/689,615, filed on Aug. 30, 2024.

(51) Int. Cl.
*H04L 45/28* (2022.01)
*H04L 41/147* (2022.01)
(Continued)

(52) U.S. Cl.
CPC ............ *H04L 45/28* (2013.01); *H04L 41/147* (2013.01); *H04L 45/02* (2013.01); *H04L 47/12* (2013.01); *H04L 45/245* (2013.01)

(58) Field of Classification Search
CPC ....... H04L 45/28; H04L 41/147; H04L 45/02; H04L 47/12; H04L 45/245
See application file for complete search history.

(56) References Cited

U.S. PATENT DOCUMENTS 7,467,224 B2 * 12/2008 Chandrayana ........ H04L 45/124 709/240
7,584,298 B2 * 9/2009 Klinker .................. H04L 45/24 709/239

(Continued)

OTHER PUBLICATIONS

"IEEE Standard for Local and Metropolitan Area Networks—Link Aggregation", In Journal of IEEE Computer Society, May 29, 2020, pp. 1-333.

(Continued)

*Primary Examiner* — Michael Won
(74) *Attorney, Agent, or Firm* — Workman Nydegger

(57) ABSTRACT

A computerized method reduces contraction loss in a network using dynamically generated rules. Topology and traffic matrix data of a network are obtained, wherein the obtained data includes data associated with a network link of the network. A first traffic scenario is simulated to determine a down loss value of the network link, and a second traffic scenario is simulated to determine a contraction loss value of the network link. A capacity aware local repair (CALR) rule of the network link is generated using the determined down loss value and the determined contraction loss value, wherein the CALR rule includes a contracted bandwidth threshold. The generated CALR rule is provided to a network device associated with the network link, wherein the network device is enabled to set the network link to inactive based on bandwidth of the network link falling below the contracted bandwidth threshold of the generated CALR rule.

20 Claims, 8 Drawing Sheets

(51) Int. Cl.
*H04L 45/02* (2022.01)
*H04L 47/12* (2022.01)
*H04L 45/24* (2022.01)

(56) References Cited

U.S. PATENT DOCUMENTS

| | | | | |
|---|---|---|---|---|
| 8,964,564 | B2 * | 2/2015 | Vasseur | H04L 45/22 709/239 |
| 9,253,097 | B1 | 2/2016 | Barman | |
| 11,296,948 | B2 * | 4/2022 | Li | H04L 43/0811 |
| 11,303,565 | B2 * | 4/2022 | Choudhury | H04Q 11/0062 |
| 2009/0187795 | A1 * | 7/2009 | Doverspike | H04L 45/12 714/43 |
| 2015/0117203 | A1 * | 4/2015 | Filsfils | H04L 47/20 370/235 |
| 2017/0346763 | A1 * | 11/2017 | Nair | H04L 49/25 |
| 2018/0109424 | A1 * | 4/2018 | Krishnaswamy | H04L 41/145 |
| 2019/0268234 | A1 * | 8/2019 | Cheng | H04L 41/0803 |
| 2023/0188429 | A1 * | 6/2023 | Neal | H04L 45/7453 709/223 |
| 2024/0388469 | A1 * | 11/2024 | Irun-Briz | H04L 12/4633 |
| 2025/0184258 | A1 * | 6/2025 | Kasiviswanathan | H04L 45/123 |
| 2026/0019301 | A1 * | 1/2026 | Irun-Briz | H04L 12/4633 |

OTHER PUBLICATIONS

Extended European Search Report Received for Application No. 25195775.9, Jan. 26, 2026, 10 Pages.

Communication pursuant to Article 94(3) Received for European Patent Application No. 25195775.9, mailed on Jul. 1, 2026, 05 pages.

* cited by examiner

REDUCING CONTRACTION LOSS IN A NETWORK USING DYNAMICALLY GENERATED RULES

CROSS-REFERENCE TO RELATED APPLICATION

This application claims priority to U.S. Provisional Patent Application No. 63/689,615, entitled "REDUCING CONTRACTION LOSS IN A NETWORK USING DYNAMICALLY GENERATED RULES," filed on Aug. 30, 2024, the disclosure of which is incorporated herein by reference in its entirety.

BACKGROUND

Modern networks group parallel network links into a link aggregation group (LAG). LAGs offer benefits like simplifying configuration when adding or removing capacity and making routing protocols faster by reducing the number of logical links on which they must operate. When a LAG loses a subset of network links, it causes congestion-related packet drops because the data traffic on the LAG exceeds the new capacity. This is called contraction loss. Sometimes, a severely contracted LAG is better to be considered unavailable than to continue operation. For instance, in situations where the network has preconfigured backup data paths with adequate capacity to serve the new traffic, the contracted LAG can be made unavailable to avoid the associated contraction loss.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for reducing contraction loss in a network using dynamically generated rules is described. Topology data and traffic matrix data of a network are obtained, wherein the obtained data includes data associated with a network link of the network. A first traffic scenario is simulated to determine a down loss value of the network link, and a second traffic scenario is simulated to determine a contraction loss value of the network link. A capacity aware local repair (CALR) rule of the network link is generated using the determined down loss value and the determined contraction loss value, wherein the CALR rule includes a contracted bandwidth threshold. The generated CALR rule is provided to a network device associated with the network link, wherein the network device is enabled to set the network link to inactive based on bandwidth of the network link falling below the contracted bandwidth threshold of the generated CALR rule.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 5, the systems are illustrated as schematic drawings. The drawings may not be to scale. Any of the figures may be combined into a single example or embodiment.

DETAILED DESCRIPTION

Figure 1:
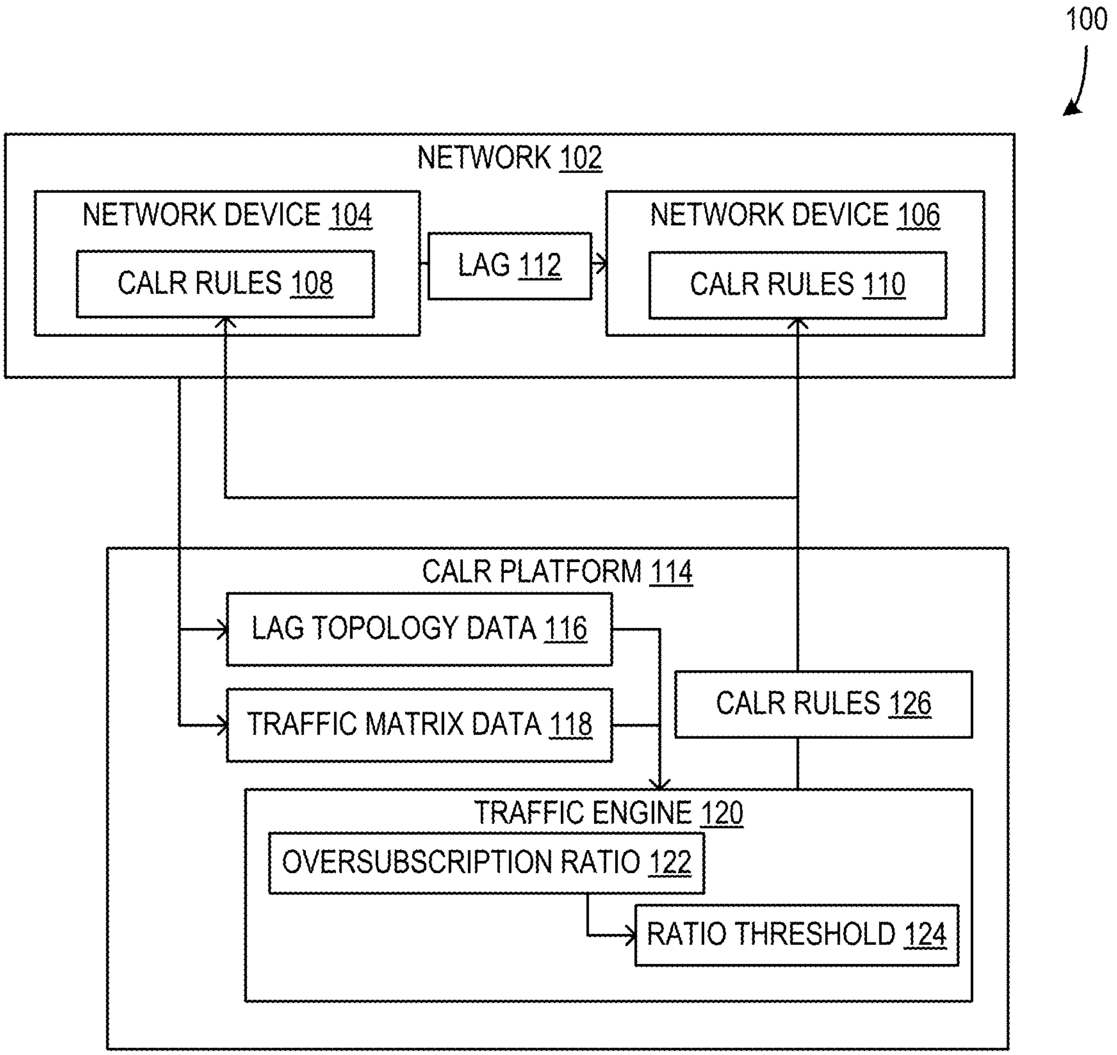
FIG. 1 is a block diagram illustrating an exemplary system configured to generate CALR rules for network devices and/or the LAG that connects the network devices.

Aspects of the disclosure provide systems and methods for reducing bandwidth costs associated with bandwidth contraction of network links using dynamically generated rules. Topology data and traffic matrix data of a network are obtained. A first traffic scenario of the network is simulated where a network link is set to an inactive state using the obtained topology data and traffic matrix data. A down loss value of the network link is determined using the simulated first traffic scenario. A second traffic scenario of the network is simulated where the network link has contracted bandwidth capacity using the obtained topology data and traffic matrix data. A contraction loss value of the network link is determined using the simulated second traffic scenario. A capacity aware local repair (CALR) rule of the network link is generated using the determined down loss value and the determined contraction loss value, wherein the CALR rule includes a contracted bandwidth threshold. Upon determining that the bandwidth of the network link has fallen below the contracted bandwidth threshold of the generated CALR rule, the network link is set to an inactive state, whereby traffic using the network link is rerouted to a backup network link.

Aspects of the disclosure operate in an unconventional manner at least by obtaining up-to-date network information, such as topology data and traffic matrix data and using that obtained information to dynamically generate CALR rules. The dynamically generated CALR rules are then used to configure network devices of the network to enable those network devices to control associated network links according to the CALR rules. Further, aspects of the disclosure enable those CALR rules on the network devices to later be updated based on changing states of the network overall. Thus, the network is not limited to static rules that control the network links but become stale over time as the state of the network changes. These aspects of the disclosure enhance the efficient use of the network resources (e.g., bandwidth, storage, computing) to transfer data traffic in comparison to solutions that use statically defined network controls and/or configurations.

Aspects of the disclosure describe the use of topology data and traffic data to generate network link rules that accurately reflect a current state of the network. This is directed to a particular improvement in maintaining connectivity and efficient bandwidth usage in a network. Specifically, the described systems and methods prevent excess losses associated with contracted bandwidth when backup network links are available. This provides a specific improvement over prior systems, resulting in improved management of network resources and reliability of communications over the associated networks. The described processes are integrated into a practical application of improved utilization of network resources.

In some examples, the described systems and methods use a real-time traffic matrix and network topology to determine the minimum links for a link aggregation group (LAG) to be active. A system is configured for periodically updating network devices with new minimum link values as conditions change. The system is configured to mark the associated LAG as inactive when the number of active links and/or the available bandwidth goes below a defined threshold and mark the associated LAG as active when the number of active links goes above the defined threshold. This signals other network devices to switch to pre-programmed backup data paths. A momentary packet drop occurs during this period, but this duration is far less than the duration of contraction loss.

In some examples, the disclosed system and method introduce a mechanism for optimizing the management of network resources through the deployment of CALR rules. The solution involves several key operations to address the technical problem. The system first obtains topology data and traffic matrix data of the network, which provides a comprehensive description of the structural and traffic-related aspects of the network, including the interconnections and flow paths within the network. The system simulates two traffic scenarios—a complete link failure and a bandwidth-contracted state—and evaluates the respective down loss and contraction loss values. These simulations enable the quantification of impact that each scenario has on the network, which is crucial for generating effective CALR rules. Based on the evaluated losses, the system generates CALR rules which specify a contracted bandwidth threshold for each network link. This threshold is calculated to ensure that links operate only when their capacity meets the minimum requirements necessary for optimum network performance. If a link's bandwidth falls below the specified threshold, the CALR rules cause the link to become inactive and reroute the traffic to pre-established backup links. This preemptive re-routing reduces the potential for packet loss and congestion during contraction events. Further, in some such examples, the described system continuously updates the CALR rules in response to real-time network conditions. This ongoing adjustment ensures that network operations are optimally maintained, adapting to traffic fluctuations and variations in link availability.

Additionally, or alternatively, the integration of CALR rules into the routing tables of network devices allows for seamless and automatic execution of these rules during operational processes, significantly enhancing network reliability and efficiency through improved management and allocation of network resources under varying conditions.

The technical effect of these exemplary systems and methods is the enhancement of network efficiency and reliability through intelligent management of network resources. This is achieved by the dynamic generation and implementation of the CALR rules, which adaptively respond to network link bandwidth contractions. By simulating potential link failure and bandwidth contraction scenarios, the method quantifies network impacts, allowing the system to establish contracted bandwidth thresholds. These thresholds inform decisions about when to deactivate a network link and reroute traffic, thereby minimizing packet loss and congestion. This results in optimized bandwidth utilization and ensures network operations remain effective despite fluctuations in traffic and link conditions. The real-time adaptability of CALR rules facilitates continuous optimization of network parameters, integrating seamlessly into existing network infrastructure to proactively manage traffic and preserve service quality.

Aspects of the disclosure collectively embody specific improvements to network management. The described systems are intrinsically tied to enhancing the operational efficiency of network resource management, specifically addressing issues of bandwidth contraction in network links. Moreover, details of the disclosure are directed towards a practical application as it involves the rearrangement and manipulation of data based on the real-world condition of the network, further supporting its eligibility by moving beyond abstract ideas to concrete technological solutions.

The disclosed exemplary systems and methods can be practically applied in optimizing network management systems where rapid adaptability to bandwidth fluctuations is critical. By implementing the CALR rules, data centers and telecommunication networks can enhance operational efficiency and reliability, particularly during bandwidth contraction events. These disclosed features are beneficial in scenarios requiring uninterrupted service quality, such as in streaming services, online gaming platforms, and cloud computing environments, where minimizing packet loss and maintaining consistent performance are pivotal. Integration of the CALR rules in network devices facilitates real-time adjustments, ensuring optimal bandwidth utilization and service continuity within diverse network infrastructures.

FIG. 1 is a block diagram illustrating an exemplary system 100 configured to generate CALR rules 108-110 for network devices 104-106 and/or the LAG 112 that connects the network devices 104-106. In some examples, the system 100 includes a network 102 that includes a plurality of network devices 104-106 that are configured to route data based on a topology and routing configuration via a LAG 112. In some examples, the network 102 includes a plurality of network devices like network devices 104-106 connected by a plurality of LAGs like LAG 112 in any arrangement without departing from the description. The CALR platform 114 obtains LAG topology data 116 and traffic matrix data 118 from the network 102 and uses the traffic engine 120 to generate CALR rules 126, which are assigned or otherwise provided to the associated network devices 104-106 as CALR rules 108-110. In some such examples, the traffic engine 120 calculates an oversubscription ratio 122 for a LAG 112 and compares the oversubscription ratio 122 to a defined ratio threshold 124. Based on the comparison, a CALR rule 108 is generated and provided to the network device 104. The network device 104 uses the CALR rule 108 to determine when to set the LAG 112 to an inactive status in response to bandwidth contraction.

Further, in some examples, the system 100 includes one or more computing devices (e.g., the computing apparatus of FIG. 4) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the network devices 104-106 are separate computing devices and the CALR platform 114 is located on another computing device within the system 100. These computing devices are configured to communicate with each other via network connections. Alternatively, in some examples, other components of the CALR platform 114 (e.g., the traffic engine 120, an interface for the LAG topology data 116 and traffic matrix data 118) are executed on separate computing devices and those separate computing devices are configured to communicate with each other via network connections during the operation of the CALR platform 114. In other examples, other organizations of computing devices are used to implement system 100 without departing from the description.

Further, in some examples, aspects of the disclosure offer a method to configure minimum links and/or minimum bandwidth in a LAG 112. Device configuration becomes complex because the minimum link or minimum bandwidth values need to be kept up to date as capacity is added or removed. Aspects of the disclosure include setting the minimum link value programmatically, and not as a static value in device configuration. A static minimum link value can cause the network link to become disconnected if it was the only link connecting two endpoints. Network disconnection is worse than contraction loss. Aspects of the disclosure are configured to consider the real-time network topology (e.g., LAG topology data 116) and set minimum link values (e.g., CALR rules 108-110) for network devices only if there are alternative data paths in order to prevent total network disconnection. Existing approaches do not consider the real time traffic matrix (e.g., using the traffic matrix data 118). A minimum link value that is set without considering current traffic conditions could cause more congestion in other links than the contraction loss. Aspects of the disclosure use the real time traffic matrix and model congestion loss in affected links in order to set minimum link values in response to changing features of traffic in the associated network.

In some examples, the CALR platform 114 performs response actions taken when a network link (e.g., a LAG 112 or an associated network device 104-106) contracts in bandwidth but does not become inactive. Link bandwidth contractions occur in LAGs 112 and cause congestion losses because they do not trigger fast reroute local repair operations. When the CALR platform 114 is enabled, some or all network devices 104-106 in the associated network 102 are configured to include link or tunnel rules (e.g., the CALR rules 108-110) that specify link or tunnel repair actions to be performed at specific link bandwidths.

Further, in some examples, aspects of the CALR platform 114 include a CALR configuration section or file and a variety of parameters, including one or more parameters for generating CALR rules 108-110 as described herein. CALR rules 108-110 for network devices 104-106 are generated and embedded in the forwarding information base (FIB) or forwarding tables that are used by the network devices 104-106 for routing data.

Aspects of the disclosure include a traffic engine 120 that supports configurable algorithms that use different heuristics to compute CALR rules 108-110. For instance, in some examples, a Link Lasso algorithm is used. The Link Lasso algorithm uses down losses and contraction losses to generate the CALR rules 108-110 and associated minimum bandwidth thresholds. Down loss is the congestion loss in affected links plus the loss of unprotected traffic that does not have backup paths after the local repair process for a link that is down, or inactive. Contraction loss is the congestion loss in the contracted link for carrying traffic in excess of the contracted bandwidth. CALR loss is contraction loss minus down loss. Minimum bandwidth is chosen so that the oversubscription ratio 122, that is CALR loss divided by the contracted link bandwidth as described in greater detail below, is less than a configured ratio threshold 124. For instance, a link with 400 units of traffic and 50 units of down loss has oversubscription ratios 122 of 2.5 at 100 units of contracted link bandwidth $$\left(\frac{350-100}{100}\right)$$

and 0.75 at 200 units of contracted link bandwidth $$\left(\frac{350-200}{200}\right),$$

respectively.

Further, in some examples, the traffic engine 120 simulates network wide fast reroute local repair operations to determine if a link is safe to bring down. By modeling or otherwise simulating the behavior of the network 102 when a LAG 112 is contracted and/or down, the traffic engine 120 determines the quantities of bandwidth loss that occur in both types of events. Primary default traffic without backup protection is added to the associated down loss value. Congestion loss after local repair processes in affected links is added to down loss. Thus, CALR rules 108-110 are not generated for a link that does not have adequate redundancy and/or a link that will cause greater loss in other parts of the network if brought down. Only the excess of contraction loss minus the down loss is protected with CALR rules 108-110 that set minimum bandwidths for links (e.g., the LAG 112 and/or the associated network link devices 104-106). Setting a higher oversubscription ratio threshold 124 will generate fewer CALR rules 108-110 set at lower minimum bandwidths.

In an example, CALR rules 108 are generated for a network device 104. The network device 104 uses two ports for transferring network data. The network device 104 has 1126 units of allocated data traffic to the first port and all of the allocated data traffic is protected by backups such that, if the network device 104 goes down, there will be no loss (e.g., no down loss). If the link bandwidth contracts to 100 units, the contraction loss is 1026 units, resulting in an oversubscription ratio 122 of 10.26

$$\left(\frac{1026}{100}\right).$$

If the link bandwidth contracts to 200 units, the contraction loss is 926 units, resulting in an oversubscription ratio 122 of 4.63

$$\left(\frac{926}{200}\right).$$

In an example where the oversubscription ratio 122 threshold is defined as 5 or less, the CALR rule 108 for the first port is set to a 200-unit bandwidth minimum. If the link bandwidth contracts to less than 200 units, the network device 104 is configured to be deactivated, resulting in the data traffic being rerouted along backup links. It should be understood that this example describes the comparison of bandwidth contraction to 100 units and bandwidth contraction to 200 units. In other examples, other levels of bandwidth contraction are used without departing from the description. For instance, in an example, the oversubscription ration 122 is optimized to be as close to the threshold of 5 without exceeding it, resulting in a bandwidth contraction level of 188

$$\left(\frac{1126-188}{188}=4.99\right).$$

The second port of the network device 104 has 2130 units of default allocated traffic. If the link goes down, there will be 239 units of congestion loss in affected links. If the link bandwidth contracts to 100 units, the contraction loss is 2030 units, resulting in an oversubscription ratio 122 of 17.91

$$\left(\frac{2030-239}{100}\right).$$

If the link bandwidth contracts to 400 units, the contraction loss is 1730 units, resulting in an oversubscription ratio 122 of 3.73

$$\left(\frac{1730-239}{400}\right).$$

In an example where the oversubscription ratio 122 threshold is defined as 5 or less, the CALR rule 108 for the second port is set to a 400-unit bandwidth minimum. If the link bandwidth contracts to less than 400 units, the network device 104 is configured to be deactivated, resulting in the data traffic being rerouted along backup links.

Figure 2A:
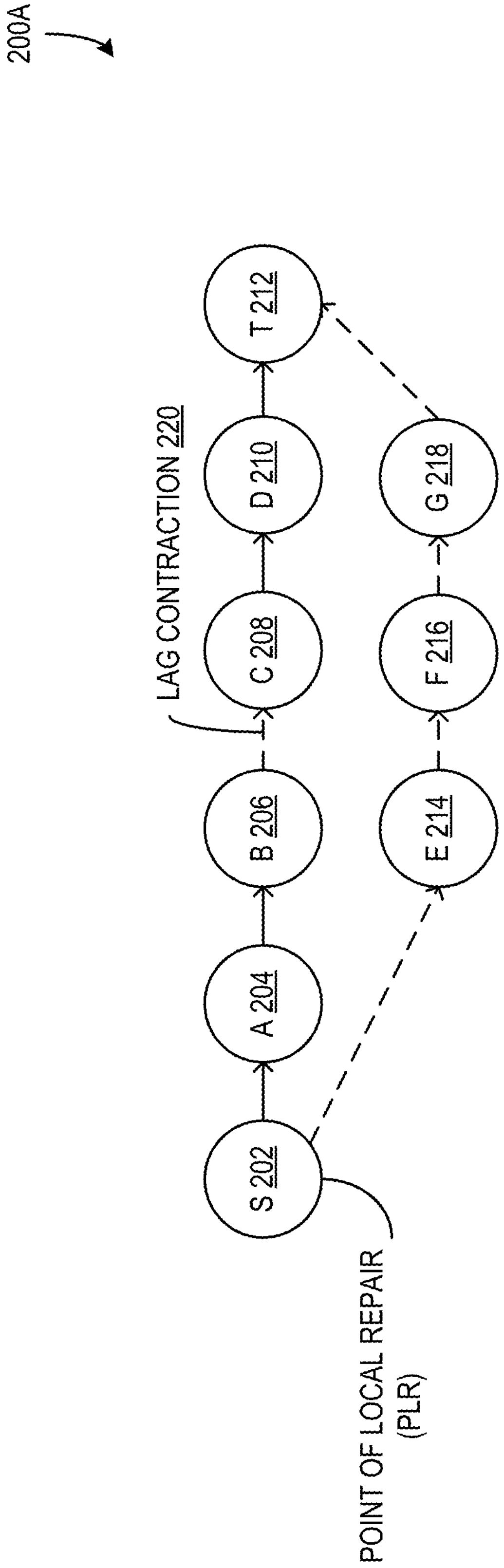
FIG. 2A is a diagram illustrating an exemplary network of devices connected by LAGs to form tunnels.

FIG. 2A is a diagram illustrating an exemplary network 200A of devices 202-218 connected by LAGs to form tunnels. The source device S 202 is configured to send data traffic to the destination device T 212 via the primary tunnel S-A-B-C-D-T using devices S 202, A 204, B 206, C 208, D 210, and T 212. The network also includes a backup tunnel S-E-F-G-T using devices S 202, E 214, F 216, G 218, and T 212. The network topology data and traffic data are used by the described system to generate CALR rules for each LAG, or link, of the network. If one of the LAGs of the primary tunnel is set to an inactive state or otherwise brought down (e.g., during a lag contraction 220), the traffic is rerouted via the backup tunnel at the point of local repair (PLR), the source device S 202 in this case. In some examples, when a CALR rule results in a LAG being set to an inactive state (e.g., the LAG between devices B 206 and C 208), a CALR tunnel rule causes the network device that is at the start of the tunnel (e.g., network device S 202) to be notified, such that that network device (e.g., source device S 202 in this case) is enabled to reroute the traffic along the backup tunnel. The PLR, source device S 202, is configured to continuously monitor tunnel liveness and to switch between primary and backup tunnels as determined by the CALR tunnel rule and/or other events in the system.

Figure 2B:
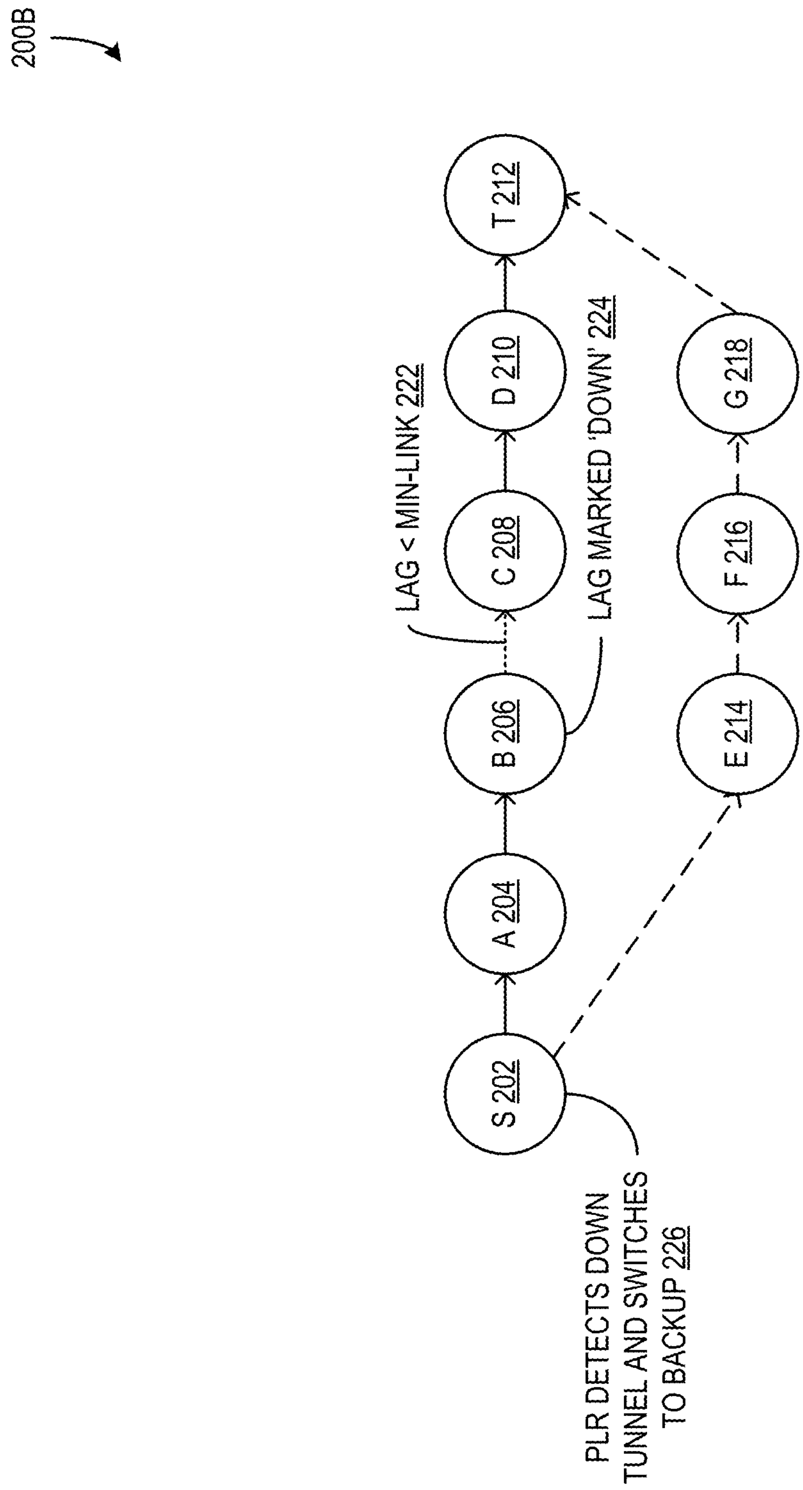
FIG. 2B is a diagram illustrating an exemplary network of devices connected by LAGs to form tunnels, as described above with respect to FIG. 2A.

FIG. 2B is a diagram illustrating an exemplary network 200B of devices connected by LAGs to form tunnels, as described above with respect to FIG. 2A. CALR link rules are generated that are based on quantities of links, such that a CALR link rule for the link from device B 206 to C 208 requires at least four links while the CALR link rule for the link from device S 202 to A 204 requires at least three links. As illustrated, if the quantity of links associated with the link from B 206 to C 208 falls below four (e.g., the quantity of links associated with the LAG falls beneath the minimum link or "min-link" value at 222), the link is marked as down at 224, which is detected by the PLR, source device S 202. The source device S 202 redirects traffic over the backup tunnel s-e-f-g-t at 226.

Figure 2C:
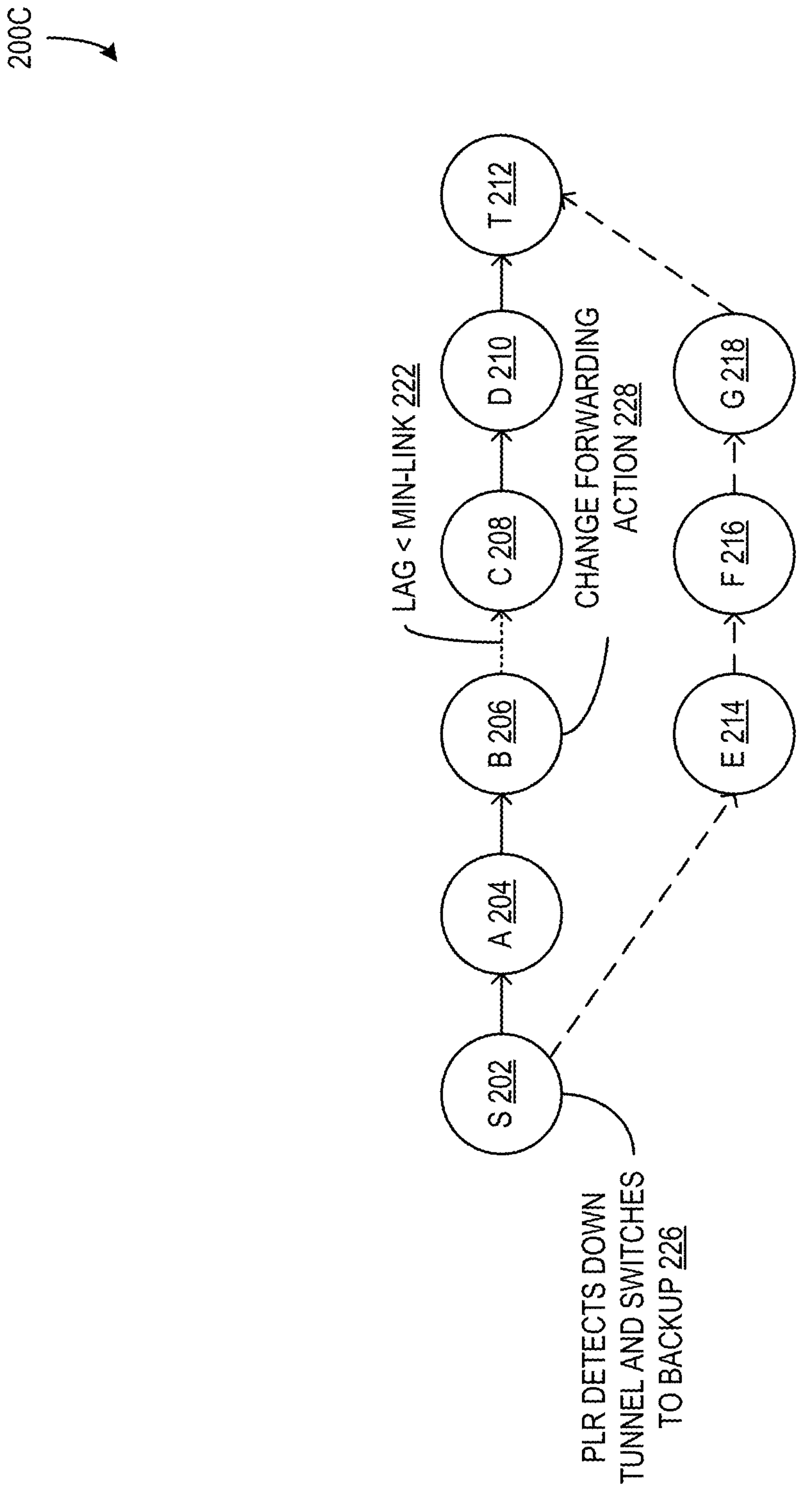
FIG. 2C is a diagram illustrating an exemplary network of devices connected by LAGs to form tunnels, as described above with respect to FIGS. 2A-B.

FIG. 2C is a diagram illustrating an exemplary network 200C of devices connected by LAGs to form tunnels, as described above with respect to FIGS. 2A-B. CALR rules are generated as described above, but the rules are CALR tunnel rules, such that the enforcement of the CALR tunnel rules is configured to affect specific tunnels through the network. The CALR tunnel rule associated with the link from device B 206 to C 208 is configured to affect tunnels 35380, 35382, and 46408. In an example where the quantity of links associated with the link from device B 206 to C 208 is less than four (e.g., the quantity of links associated with the LAG falls beneath the min-link value at 222), the CALR tunnel rule results in the traffic associated with the tunnels 35380, 35382, and 46408 being rerouted to backup tunnels through a change in forwarding action at 228, such as rerouting traffic from device S 202 along tunnel s-e-f-g-t at 226.

Figure 3:
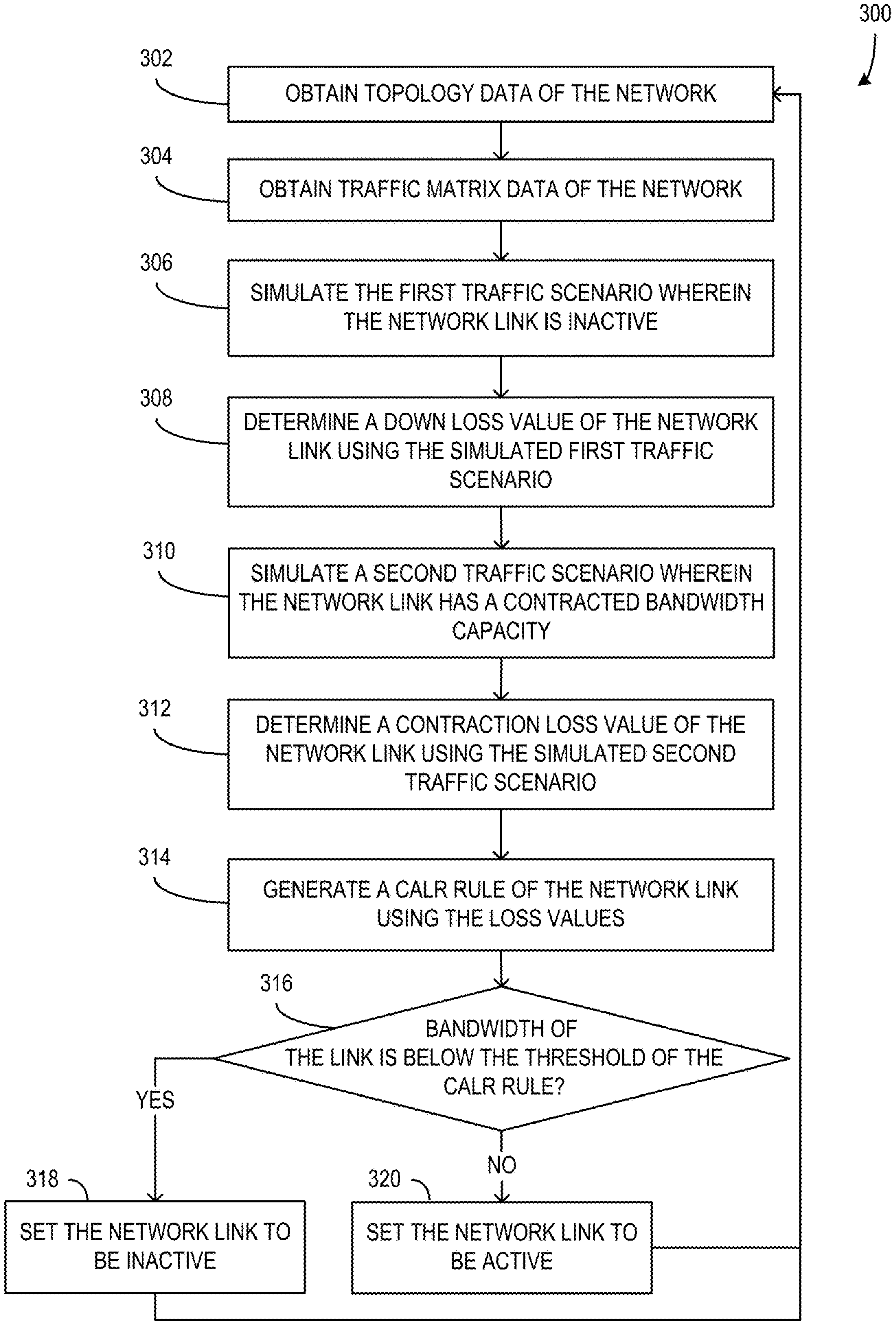
FIG. 3 is a flowchart illustrating an exemplary method for generating and using CALR rules in association with network links, such as LAGs, in a network.

FIG. 3 is a flowchart illustrating an exemplary method 300 for generating and using CALR rules (e.g., CALR rules 108, 110, and/or 126) in association with network links, such as LAGs (e.g., LAG 112), in a network (e.g., network 102). In some examples, the method 300 is executed or otherwise performed in a system such as system 100 of FIG. 1.

At 302, topology data (e.g., LAG topology data 116) of the network is obtained. In some examples, the topology data describes the structure of the network, including information describing the network devices and the network link connections between the network devices. Further, the topology data is obtained from a controller or other entity associated with the network that maintains an up-to-date set of topology data based on the current state of the network and accounting for adding and/or removing network devices and/or network links to and/or from the network.

At 304, traffic matrix data (e.g., traffic matrix data 118) of the network is obtained. In some examples, the traffic matrix data describes the flow of data traffic through the network, including data that is indicative of the bandwidth of data traffic through specific network links over time. Further, in some examples, the traffic matrix data is collected in real-time or near real-time such that the method 300 is configured to be responsive to changes in the flow of data traffic over time. The traffic matrix data is collected from a controller or other entity of the network that maintains such traffic matrix data or otherwise collects the traffic matrix data from network devices of the network. It should be understood that, in some examples, the real-time traffic matrix data is obtained periodically and based on the newly obtained data, the method 300 is performed to generate updated CALR rules. Thus, the method 300 is configured to respond to changing conditions of the network in such examples.

At 306, the first traffic scenario of the network is simulated. The first traffic scenario includes the network link being treated as if it is inactive or down. The method 300 uses the topology data and the traffic matrix data to determine how the network would respond to the network link being inactive, including determining or otherwise identifying one or more backup network links that can be used in the event of the network link being inactive.

At 308, a down loss value of the network link is determined using the first traffic scenario. In some examples, the down loss value includes the quantity of data traffic that is intended for the network link that cannot be sent via backup network links based on the results of the simulated first traffic scenario. Thus, the down loss value represents the quantity of data traffic that will fail to be successfully transmitted by the network when the network link is inactive.

At 310, a second traffic scenario of the network is simulated. The second traffic scenario includes the network link being treated as if the bandwidth of the network link is contracted to a contracted bandwidth value.

At 312, a contraction loss value of the network link is determined using the second traffic scenario. In some examples, the contraction loss value is determined by subtracting the contracted bandwidth value from the starting bandwidth value of the network link.

Additionally, or alternatively, in some examples, the second traffic scenario is simulated with a variety of different contracted bandwidth values in order to identify a contracted bandwidth value that results in an oversubscription ratio that is equal to or less than a ratio threshold 124. In some such examples, a variety of contracted bandwidth values are simulated and the contracted bandwidth value that yields the oversubscription ratio 122 that is closest to the ratio threshold 124 without exceeding the ratio threshold is selected as the contracted bandwidth value.

At 314, a CALR rule of the network link is generated using the determined loss values. In some examples, the CALR rule includes an identifier of the network link and a contracted bandwidth threshold that defines a point at which the associated network link will be set to be inactive with respect to the network. Further, in some examples, generating the CALR rule includes generating a CALR tunnel rule or rules associated with the network link. In such examples, the network link is part of one or more tunnels, or series of network links that form multi-link connections between source network devices and destination network devices. CALR tunnel rules include identifiers for the tunnels with which the network link is associated and, when the network link is caused to be set to an inactive state, the CALR tunnel rule enables the network to set each of the associated tunnels to inactive at the source network devices of those tunnels, thereby enabling any backup tunnels to be used instead.

Additionally, or alternatively, in some examples, generating the CALR rule includes subtracting the down loss value from the contraction loss value to form a CALR loss value. The CALR loss value is then divided by the contracted bandwidth value of the network link to form an oversubscription ratio (e.g., oversubscription ratio 122). The oversubscription ratio is compared to an oversubscription ratio threshold (e.g., ratio threshold 124) and, based on the oversubscription ratio being equal to or less than the oversubscription ratio threshold, the CALR rule is generated with respect to that contracted bandwidth value.

At 316, if the bandwidth of the link is below the threshold of the CALR rule, the process proceeds to 318. Alternatively, if the bandwidth of the like is above the threshold of the CALR rule, the process proceeds to 320.

At 318, the network link is set to be inactive. Additionally, or alternatively, in some examples, after the network link is set to be inactive, the process returns to 302 to obtain updated topology data and/or traffic matrix data of the network.

At 320, the network link is set to be active. Additionally, or alternatively, in some examples, after the network link is set to be active, the process returns to 302 to obtain updated topology data and/or traffic matrix data of the network.

Further, in some examples, the generated CALR rule is provided to the network device that is associated with the network link and stored in a routing table of that network device. Thus, the network device is enabled to cause the network link to be set to an inactive state based on the contracted bandwidth threshold of the CALR rule.

Figure 4A:
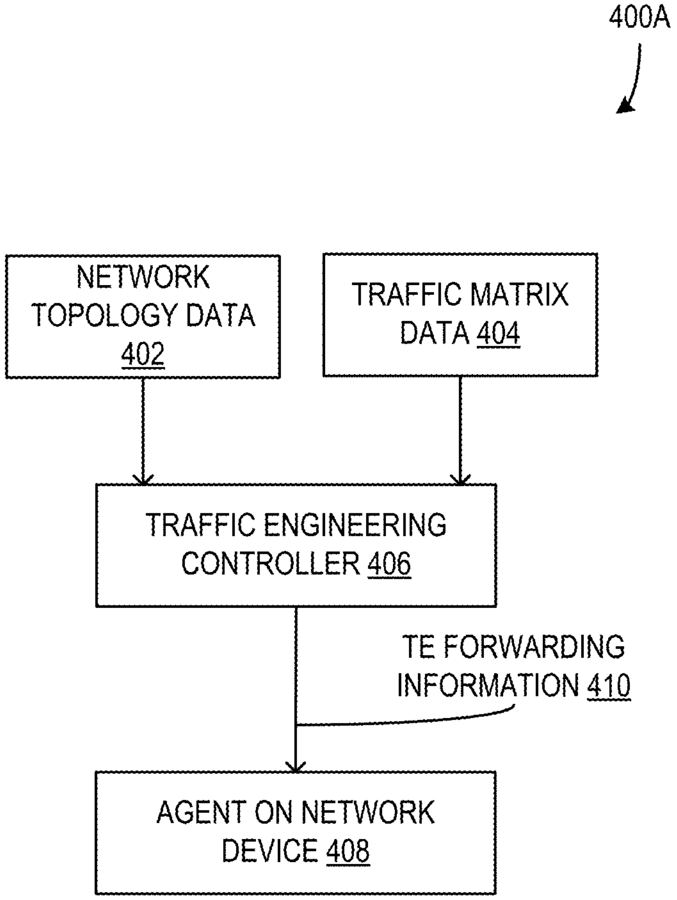
FIG. 4A is a block diagram illustrating an exemplary system configured to generate forwarding information at a traffic engineering (TE) controller and to provide the forwarding information to an agent on the network device.

FIG. 4A is a block diagram illustrating an exemplary system 400A configured to generate forwarding information at a traffic engineering (TE) controller 406 and to provide the forwarding information 410 to an agent on the network device 408. In some examples, the traffic engineering controller 406 uses topology data 402 (e.g., LAG topology data 116) and traffic matrix data 404 (e.g., traffic matrix data 118) to generate forwarding information. In some such examples, the traffic engineering controller 406 is part of or otherwise associated with a CALR platform 114 as described herein and the forwarding information includes the CALR rules 126 generated by the CALR platform 114. The CALR rules 126 are transferred to agents on network devices 408 such as network devices 104-106 and stored in those network devices 104-106 as CALR rules 108-110. Further, it should be understood that other forwarding information, such as the configuration of link tunnels in the network, are also provided to the agents of the network devices 408 by the traffic engineering controller 406 without departing from the description.

Figure 4B:
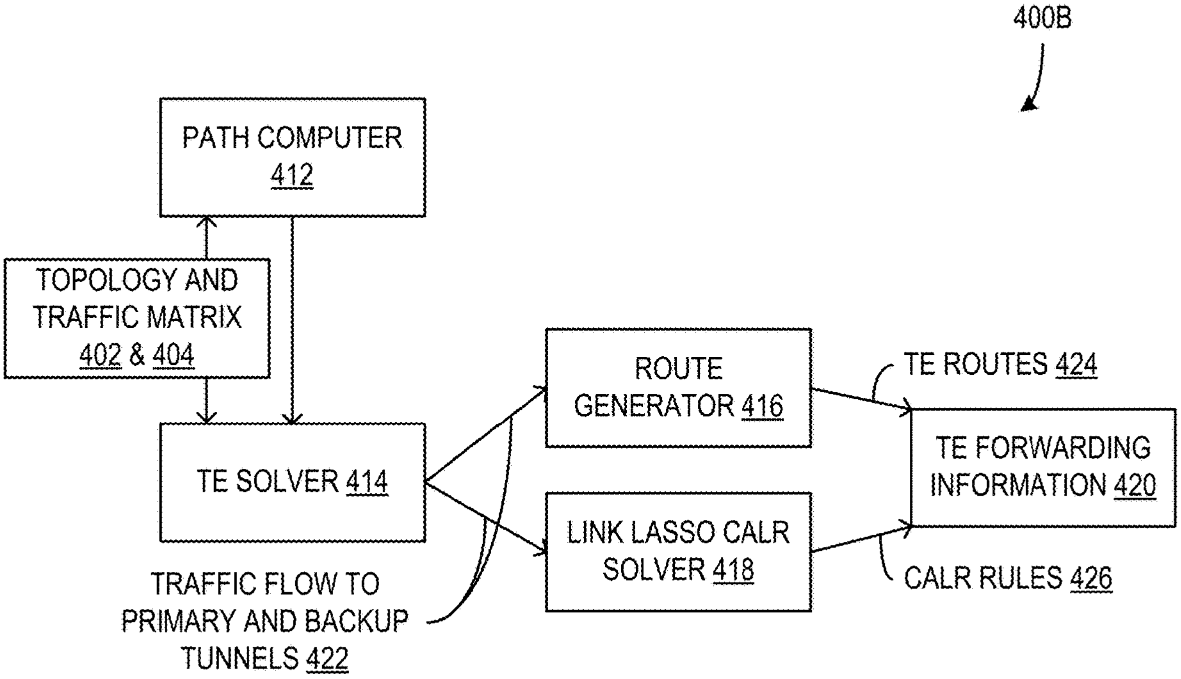
FIG. 4B is a block diagram illustrating an exemplary system configured to generate forwarding information and/or other associated information as described herein.

FIG. 4B is a block diagram illustrating an exemplary system 400B configured to generate forwarding information 420 and/or other associated information as described herein. The topology data 402 (e.g., LAG topology data 116) and traffic matrix data 404 (e.g., traffic matrix data 118) are provided to the path computer 412 and the TE solver 414. The path computer 412 is configured to calculate paths through the network using the topology data 402 and traffic matrix data 404 and the TE solver 414 is configured to determine traffic flow information 422 through primary tunnels and backup tunnels based on the calculated paths. The determined traffic flow information 422 is provided to the route generator 416 and the Link Lasso CALR solver 418. The route generator 416 is configured to generate TE routes 424 using the traffic flow information 422 and the Link Lasso CALR solver 418 is configured to generate CALR rules 426 as described herein. In some examples, some or all of the entities of system 400B are part of or otherwise associated with a system such as system 100 of FIG. 1 as described herein. The generated TE routes 424 and CALR rules 426 are then provided as forwarding information 420 to the agents of the network devices 408 in the network as described above with respect to FIG. 4A.

Exemplary Operating Environment

Figure 5:
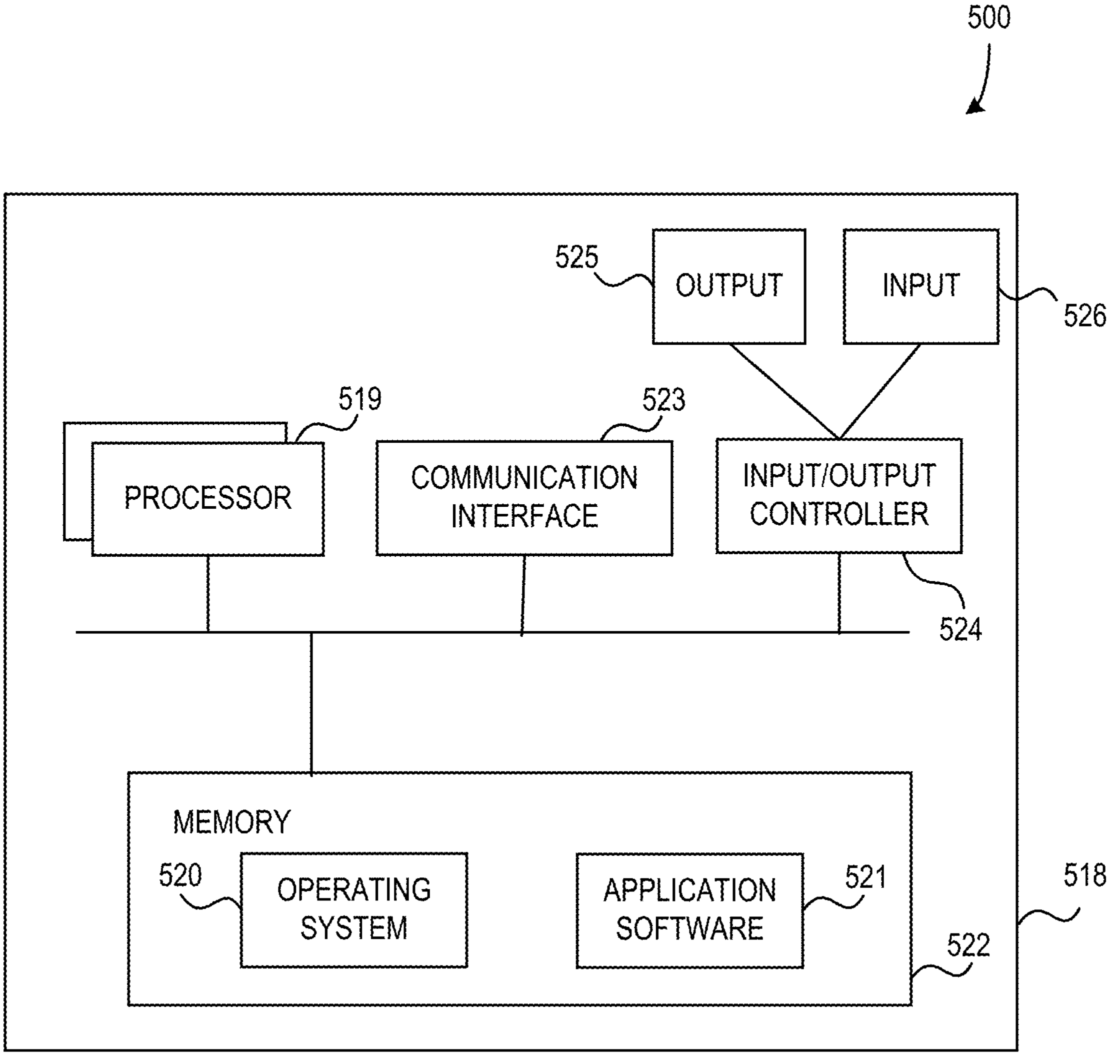
FIG. 5 illustrates an example computing apparatus as a functional block diagram.

The present disclosure is operable with a computing apparatus according to an embodiment as a functional block diagram 500 in FIG. 5. In an example, components of a computing apparatus 518 are implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hard-coded machine. In some examples, platform software comprising an operating system 520 or any other suitable platform software is provided on the apparatus 518 to enable application software 521 to be executed on the device. In some examples, generating and using CALR rules to reduce bandwidth loss associated with network link contraction as described herein is accomplished by software, hardware, and/or firmware.

In some examples, computer executable instructions are provided using any computer-readable media that is accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium is not a propagating signal. Propagated signals are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 may also output data to devices other than the output device, e.g., a locally connected printing device. In some examples, a user provides input to the input device(s) 526 and/or receives output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: obtain topology data associated with a network, wherein the network includes a network link, and a network device associated with the network link; obtain traffic matrix data associated with the network, including traffic matrix data associated with the network link; simulate a first traffic scenario of the network where the network link is set to an inactive state using the obtained topology data and the obtained traffic matrix data; determine a down loss value of the network link using the simulated first traffic scenario; simulate a second traffic scenario of the network where the network link has contracted bandwidth capacity using the obtained topology data and the obtained traffic matrix data; determine a contraction loss value of the network link using the simulated second traffic scenario; generate a capacity aware local repair (CALR) rule of the network link using the determined down loss value and the determined contraction loss value, wherein the CALR rule includes a contracted bandwidth threshold; determine that bandwidth of the network link has fallen below the contracted bandwidth threshold of the generated CALR rule; based on determining that the bandwidth has fallen below the contracted bandwidth threshold, cause the network link to be set to an inactive state; and based on the network link being set to the inactive state, cause traffic that would otherwise be routed to the network link to be rerouted to a backup network link.

An example computerized method comprises obtaining topology data associated with a network, wherein the network includes a network link, and a network device associated with the network link; obtaining traffic matrix data associated with the network, including traffic matrix data associated with the network link; simulating a first traffic scenario of the network where the network link is set to an inactive state using the obtained topology data and the obtained traffic matrix data; determining a down loss value of the network link using the simulated first traffic scenario; simulating a second traffic scenario of the network where the network link has contracted bandwidth capacity using the obtained topology data and the obtained traffic matrix data; determining a contraction loss value of the network link using the simulated second traffic scenario; generating a capacity aware local repair (CALR) rule of the network link using the determined down loss value and the determined contraction loss value, wherein the CALR rule includes a contracted bandwidth threshold; and sending the generated CALR rule to the network device of the network link, wherein the network device is enabled to set the network link to inactive based on bandwidth of the network link falling below the contracted bandwidth threshold of the generated CALR rule.

An example computer storage medium has computer-executable instructions that, upon execution by a processor, cause the processor to at least: obtain traffic matrix data associated with a network link; determine a down loss value of the network link using the obtained traffic matrix data; determine a contraction loss value of the network link the obtained traffic matrix data; generate a capacity aware local repair (CALR) rule of the network link using the determined down loss value and the determined contraction loss value; determine that bandwidth of the network link triggers the generated CALR rule; and cause the network link to be set to an inactive state based on the triggering of the generated CALR rule, whereby traffic using the network link is rerouted to a backup network link.

Alternatively, or in addition to the other examples described herein, examples include any combination of the following:

- wherein generating the CALR rule of the network link includes generating a tunnel rule of the network link, wherein the tunnel rule is associated with a tunnel of multiple network links from a source network device to a destination device; and wherein causing the network link to be set to an inactive state further causes the tunnel of the multiple network links to be set to an inactive state at the source network device, whereby traffic that would otherwise be routed to the tunnel is rerouted to a backup tunnel.
- wherein generating the CALR rule includes: subtracting the down loss value from the contraction loss value to form a CALR loss value; dividing the CALR loss value by a contracted bandwidth value of the network link to form an oversubscription ratio; determining that the oversubscription ratio is less than an oversubscription ratio threshold; and based on determining the oversubscription ratio is less than the oversubscription ratio threshold, generate the CALR rule including the contracted bandwidth value of the network link as the contracted bandwidth threshold.
- wherein the obtained traffic matrix data includes real-time traffic matrix data and the obtained traffic matrix data is obtained periodically; and wherein generating the CALR rule of the network link includes generating an updated CALR rule periodically based on the real-time traffic matrix data in the periodically obtained traffic matrix data.
- wherein the obtained traffic matrix data includes primary tunnel data describing primary series of network links from source network devices to destination network devices and backup tunnel data describing backup series of network links from the source network devices to the destination network devices; and wherein determining the down loss value of the network link and determining the contraction loss value of the network link use the primary tunnel data and the backup tunnel data of the obtained traffic matrix data.
- further comprising: causing the CALR rule to be stored in a routing table of the network device associated with the network link, whereby the network device is enabled to cause the network link to be set to the inactive state based on the contracted bandwidth threshold of the CALR rule.
- further comprising: determining that bandwidth of the network link has exceeded the contracted bandwidth threshold of the generated CALR rule; and based on determining that the bandwidth has exceeded the contracted bandwidth threshold, cause the network link to be set to active, whereby traffic is routed to the network link.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining topology data associated with a network, wherein the network includes a network link, and a network device associated with the network link; an exemplary means for obtaining traffic matrix data associated with the network, including traffic matrix data associated with the network link; an exemplary means for simulating a first traffic scenario of the network where the network link is set to an inactive state using the obtained topology data and the obtained traffic matrix data; an exemplary means for determining a down loss value of the network link using the simulated first traffic scenario; an exemplary means for simulating a second traffic scenario of the network where the network link has contracted bandwidth capacity using the obtained topology data and the obtained traffic matrix data; an exemplary means for determining a contraction loss value of the network link using the simulated second traffic scenario; an exemplary means for generating a capacity aware local repair (CALR) rule of the network link using the determined down loss value and the determined contraction loss value, wherein the CALR rule includes a contracted bandwidth threshold; and an exemplary means for sending the generated CALR rule to the network device of the network link, wherein the network device is enabled to set the network link to inactive based on bandwidth of the network link falling below the contracted bandwidth threshold of the generated CALR rule.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory comprising computer program code, the memory and the computer program code configured to cause the processor to:

obtain topology data associated with a network, wherein the network includes a network link and a network device associated with the network link;

obtain traffic matrix data associated with the network, including traffic matrix data associated with the network link;

simulate a first traffic scenario of the network where the network link is set to an inactive state using the obtained topology data and the obtained traffic matrix data;

determine a down loss value of the network link using the simulated first traffic scenario;

simulate a second traffic scenario of the network where the network link has a contracted bandwidth capacity using the obtained topology data and the obtained traffic matrix data;

determine a contraction loss value of the network link using the simulated second traffic scenario;

generate a capacity aware local repair (CALR) rule of the network link using the determined down loss value and the determined contraction loss value, wherein generating the CALR rule comprises calculating a contracted bandwidth threshold for the network link based on a requirement for performance of the network, the CALR rule including the contracted bandwidth threshold;

determine that bandwidth of the network link has fallen below the contracted bandwidth threshold of the generated CALR rule;

based on determining that the bandwidth has fallen below the contracted bandwidth threshold, cause the network link to be set to an inactive state; and based on the network link being set to the inactive state, cause traffic that would otherwise be routed to the network link to be rerouted to a backup network link.

2. The system of claim 1, generating the CALR rule of the network link further comprising:

generating a tunnel rule of the network link, the tunnel rule being associated with a tunnel of a plurality of network links from a source network device to a destination network device; and wherein causing the network link to be set to an inactive state further causes the tunnel of the plurality of network links to be set to an inactive state at the source network device, whereby the traffic that would otherwise be routed to the tunnel is rerouted to a backup tunnel.

3. The system of claim 1, wherein generating the CALR rule includes:

subtracting the down loss value from the contraction loss value to form a CALR loss value;

dividing the CALR loss value by a contracted bandwidth value of the network link to form an oversubscription ratio;

determining that the oversubscription ratio is less than an oversubscription ratio threshold; and based on determining the oversubscription ratio is less than the oversubscription ratio threshold, generate the CALR rule including the contracted bandwidth value of the network link as the contracted bandwidth threshold.

4. The system of claim 1:

wherein the obtained traffic matrix data:

includes real-time traffic matrix data, and the obtained traffic matrix data is obtained periodically; and generating the CALR rule of the network link further comprises periodically generating an updated CALR rule based at least in part on the periodically obtained real-time traffic matrix data.

5. The system of claim 1, wherein:

the obtained traffic matrix data includes primary tunnel data describing a primary series of network links from source network devices to destination network devices and backup tunnel data describing a backup series of network links from the source network devices to the destination network devices; and determining the down loss value of the network link or determining the contraction loss value of the network link further comprises using the primary tunnel data and the backup tunnel data of the obtained traffic matrix data.

6. The system of claim 1, wherein the computer program code is configured to further cause the processor to:

cause the CALR rule to be stored in a routing table of the network device associated with the network link, whereby the network device is enabled to cause the network link to be set to the inactive state based on the contracted bandwidth threshold of the CALR rule.

7. The system of claim 1, wherein the computer program code is configured to further cause the processor to:

determine that bandwidth of the network link has exceeded the contracted bandwidth threshold of the generated CALR rule; and based on determining that the bandwidth has exceeded the contracted bandwidth threshold, cause the network link to be set to active, whereby traffic is routed to the network link.

8. A computerized method comprising:

obtaining topology data associated with a network, wherein the network includes a network link and a network device associated with the network link;

obtaining traffic matrix data associated with the network, including traffic matrix data associated with the network link;

simulating a first traffic scenario of the network where the network link is set to an inactive state using the obtained topology data and the obtained traffic matrix data;

determining a down loss value of the network link using the simulated first traffic scenario;

simulating a second traffic scenario of the network where the network link has a contracted bandwidth capacity using the obtained topology data and the obtained traffic matrix data;

determining a contraction loss value of the network link using the simulated second traffic scenario;

generating a capacity aware local repair (CALR) rule of the network link using the determined down loss value and the determined contraction loss value, wherein generating the CALR rule comprises calculating a contracted bandwidth threshold for the network link based on a requirement for performance of the network, the CALR rule including the contracted bandwidth threshold;

sending the generated CALR rule to the network device of the network link; and wherein the network device is enabled to set the network link to inactive based on bandwidth of the network link falling below the contracted bandwidth threshold of the generated CALR rule.

9. The computerized method of claim 8, generating the CALR rule of the network link further comprising:

generating a tunnel rule of the network link, the tunnel rule being associated with a tunnel of a plurality of network links from a source network device to a destination network device; and wherein causing the network link to be set to an inactive state further causes the tunnel of the plurality of network links to be set to an inactive state at the source network device, whereby the traffic that would otherwise be routed to the tunnel is rerouted to a backup tunnel.

10. The computerized method of claim 8, wherein generating the CALR rule includes:

subtracting the down loss value from the contraction loss value to form a CALR loss value;

dividing the CALR loss value by a contracted bandwidth value of the network link to form an oversubscription ratio;

determining that the oversubscription ratio is less than an oversubscription ratio threshold; and based on determining the oversubscription ratio is less than the oversubscription ratio threshold, generate the CALR rule including the contracted bandwidth value of the network link as the contracted bandwidth threshold.

11. The computerized method of claim 8, wherein:

the obtained traffic matrix data:

includes real-time traffic matrix data, and the obtained traffic matrix data is obtained periodically; and generating the CALR rule of the network link further comprises periodically generating an updated CALR rule based at least in part on the periodically obtained real-time traffic matrix data.

12. The computerized method of claim 8, wherein:

the obtained traffic matrix data includes primary tunnel data describing a primary series of network links from source network devices to destination network devices and backup tunnel data describing a backup series of network links from the source network devices to the destination network devices; and determining the down loss value of the network link or determining the contraction loss value of the network link further comprises using the primary tunnel data and the backup tunnel data of the obtained traffic matrix data.

13. The computerized method of claim 8, further comprising:

determining that bandwidth of the network link has exceeded the contracted bandwidth threshold of the generated CALR rule; and based on determining that the bandwidth has exceeded the contracted bandwidth threshold, causing the network link to be set to active, whereby traffic is routed to the network link.

14. A computer storage medium has computer-executable instructions that, upon execution by a processor, cause the processor to at least:

obtain traffic matrix data associated with a network link;
determine a down loss value of the network link using the obtained traffic matrix data;
determine a contraction loss value of the network link the obtained traffic matrix data;
generate a capacity aware local repair (CALR) rule of the network link using the determined down loss value and the determined contraction loss value, wherein generating the CALR rule comprises calculating a contracted bandwidth threshold for the network link based on a requirement for performance of the network, the CALR rule including the contracted bandwidth threshold;
determine that bandwidth of the network link triggers the generated CALR rule; and
cause the network link to be set to an inactive state based on the triggering of the generated CALR rule, whereby traffic using the network link is rerouted to a backup network link.

15. The computer storage medium of claim 14, generating the CALR rule of the network link further comprises:
generating a tunnel rule of the network link, the tunnel rule being associated with a tunnel of a plurality of network links from a source network device to a destination network device; and
wherein causing the network link to be set to an inactive state further causes the tunnel of the plurality of network links to be set to an inactive state at the source network device, whereby the traffic that would otherwise be routed to the tunnel is rerouted to a backup tunnel.

16. The computer storage medium of claim 14, wherein generating the CALR rule includes:
subtracting the down loss value from the contraction loss value to form a CALR loss value;
dividing the CALR loss value by a contracted bandwidth value of the network link to form an oversubscription ratio;
determining that the oversubscription ratio is less than an oversubscription ratio threshold; and
based on determining the oversubscription ratio is less than the oversubscription ratio threshold, generate the CALR rule including the contracted bandwidth value of the network link as the contracted bandwidth threshold.

17. The computer storage medium of claim 14;
wherein the obtained traffic matrix data:
includes real-time traffic matrix data, and
the obtained traffic matrix data is obtained periodically; and
generating the CALR rule of the network link further comprises periodically generating an updated CALR rule based at least in part on the periodically obtained real-time traffic matrix data.

18. The computer storage medium of claim 14, wherein;
the obtained traffic matrix data includes primary tunnel data describing a primary series of network links from source network devices to destination network devices and backup tunnel data describing a backup series of network links from the source network devices to the destination network devices; and
determining the down loss value of the network link or determining the contraction loss value of the network link further comprises using the primary tunnel data and the backup tunnel data of the obtained traffic matrix data.

19. The computer storage medium of claim 14, wherein the computer-executable instructions, upon execution by the processor, further cause the processor to at least:
cause the CALR rule to be stored in a routing table of a network device associated with the network link, whereby the network device is enabled to cause the network link to be set to the inactive state based on a contracted bandwidth threshold of the CALR rule.

20. The computer storage medium of claim 14, wherein the computer-executable instructions, upon execution by the processor, further cause the processor to at least:
determine that bandwidth of the network link has exceeded the contracted bandwidth threshold of the generated CALR rule; and
based on determining that the bandwidth has exceeded the contracted bandwidth threshold, cause the network link to be set to active, whereby traffic is routed to the network link.

* * * * *